US009120541B1

(12) United States Patent
Turner et al.

(10) Patent No.: US 9,120,541 B1
(45) Date of Patent: Sep. 1, 2015

(54) ANCHOR RETRIEVAL DEVICE

(71) Applicants: Ronald G Turner, Havre, MT (US); David Yakos, Bozeman, MT (US); Kyle Gunnarson, Bozeman, MT (US); Ross Walker, Bozeman, MT (US)

(72) Inventors: Ronald G Turner, Havre, MT (US); David Yakos, Bozeman, MT (US); Kyle Gunnarson, Bozeman, MT (US); Ross Walker, Bozeman, MT (US)

(73) Assignee: Ronald G. Turner, Havre, MT (US)

( * ) Notice: Subject to any disclaimer, the term of this patent is extended or adjusted under 35 U.S.C. 154(b) by 0 days.

(21) Appl. No.: 14/251,611

(22) Filed: Apr. 13, 2014

(51) Int. Cl.
  *A63B 21/22* (2006.01)
  *B63B 21/22* (2006.01)
  *B63B 21/04* (2006.01)

(52) U.S. Cl.
  CPC ............ *B63B 21/22* (2013.01); *B63B 21/04* (2013.01)

(58) Field of Classification Search
  CPC ........ B63B 21/08; B63B 21/04; B63B 21/22; A62B 1/06; A62B 1/14
  USPC ............... 294/137, 170, 171; 24/129 R, 130; 114/210; 188/65.4; 182/191–193
  See application file for complete search history.

(56) References Cited

U.S. PATENT DOCUMENTS

| | | | | |
|---|---|---|---|---|
| 284,305 | A | * | 9/1883 | Jones ............................ 182/192 |
| 736,631 | A | * | 8/1903 | Priddat ......................... 294/137 |
| 751,649 | A | * | 2/1904 | Ives .............................. 188/65.4 |
| 2,955,560 | A | | 10/1960 | Howlington et al. |
| 4,302,869 | A | * | 12/1981 | Hackney ..................... 24/115 R |
| 4,787,660 | A | * | 11/1988 | Mrazek ......................... 294/219 |
| D336,732 | S | * | 6/1993 | Joyner .......................... D9/434 |
| D433,929 | S | * | 11/2000 | Petzl ............................. D8/383 |
| D548,073 | S | * | 8/2007 | Peaslee et al. ................ D9/434 |
| 8,225,905 | B2 | * | 7/2012 | Delaittre et al. ............. 182/192 |
| 8,347,806 | B2 | | 1/2013 | Griffin |
| 2004/0163898 | A1 | * | 8/2004 | Bergquist ..................... 188/65.2 |
| 2006/0017300 | A1 | * | 1/2006 | Erickson et al. ............. 294/171 |
| 2012/0012045 | A1 | | 1/2012 | Griffin |

* cited by examiner

*Primary Examiner* — Dean Kramer
(74) *Attorney, Agent, or Firm* — Antoinette M. Tease

(57) ABSTRACT

An anchor retrieval device comprising a frame forming a closed loop and having a proximal end and a distal end, and a handle overlaid onto the frame on a top part of the frame. The frame comprises an upper rope guide flange that forms an upper rope guide groove, the upper rope guide flange and upper rope guide groove being situated on the distal end of the frame. The frame further comprises a lower rope guide flange that forms a lower rope guide groove, the lower rope guide flange and lower rope guide groove being situated rearward of the upper rope guide flange and upper rope guide groove on a bottom part of the frame.

3 Claims, 9 Drawing Sheets

ANCHOR RETRIEVAL DEVICE

BACKGROUND OF THE INVENTION

1. Field of the Invention

The present invention relates generally to the field of anchor retrieval devices, and more specifically, to a handheld, manual anchor retrieval device for use in drill boats and the like.

2. Description of the Related Art

Lifting a 35- to 40-pound anchor by hand in a drift boat is both strenuous and hard on a person's hands. There are no anchor retrieval devices on the market today that are lightweight, portable, and easy to use. Prior art devices are cumbersome and/or impractical. One example is the anchor line controller of U.S. Pat. No. 2,955,560 (Howington et al., 1960). Howington's device comprises a clamping means that is secured to the transom of the boat. The device further comprises a line guide, a guiding pulley, and a pivot bar that is secured to the line guide. A spring-biased wedge pinches the anchor line against a portion of the housing. This device is heavy and much larger than the present invention. It would likely require its own storage bag and would not be thrown into a tackle bag along with other fishing gear. Furthermore, this device is not handheld.

The second example is the anchor raising apparatus of U.S. Pat. No. 8,347,806 (Griffin, 2013). This device is a single-piece clip formed of cylindrical stainless steel (similar to a big paper clip) that is attached to an anchor line with a sliding motion. The device is also attached to a buoy, which helps pull a portion of the anchor line toward the surface of the body of water. The anchor line still has to be retrieved manually, however. Other than bringing the anchor line closer to the surface, this device does not assist at all in pulling the anchor line into the boat, nor does it alleviate any of the strain on the user's hands.

What is needed is an anchor retrieval device that is lightweight, portable and easily attached to an anchor line. The ideal device would have no moving parts that may get corroded or require maintenance. It would provide additional leverage for a person attempting to pull an anchor line up into a drift boat manually. The present invention meets all of these criteria and is economically designed to provide for a more natural movement when pulling on the rope.

BRIEF SUMMARY OF THE INVENTION

The present invention is an anchor retrieval device comprising a frame forming a closed loop and having a proximal end and a distal end, and a handle overlaid onto the frame on a top part of the frame; wherein the frame comprises an upper rope guide flange that forms an upper rope guide groove, the upper rope guide flange and upper rope guide groove being situated on the distal end of the frame; and wherein the frame further comprises a lower rope guide flange that forms a lower rope guide groove, the lower rope guide flange and lower rope guide groove being situated rearward of the upper rope guide flange and upper rope guide groove on a bottom part of the frame.

In a preferred embodiment, the handle has a proximal end and a distal end, and the distal end of the handle comprises a straight grip groove located on a central longitudinal axis of the handle and a side grip groove that is offset from the straight grip groove and situated on a side of the handle proximate to the upper rope guide groove and the lower rope guide groove. The proximal end of the frame preferably comprises a plurality of holes for attaching a lanyard.

In one embodiment, the lower rope guide groove comprises a plurality of pointed protrusions on an inside surface of the lower rope guide groove. In another embodiment, the lower rope guide groove comprises a bottom, two side walls, and a plurality of ribs that extend from the bottom of the lower rope guide groove and up the two side walls of the lower rope guide groove. In a preferred embodiment, the upper rope guide groove and lower rope guide groove form a pathway that encircles a rope.

REFERENCE NUMBERS

Figure 1:
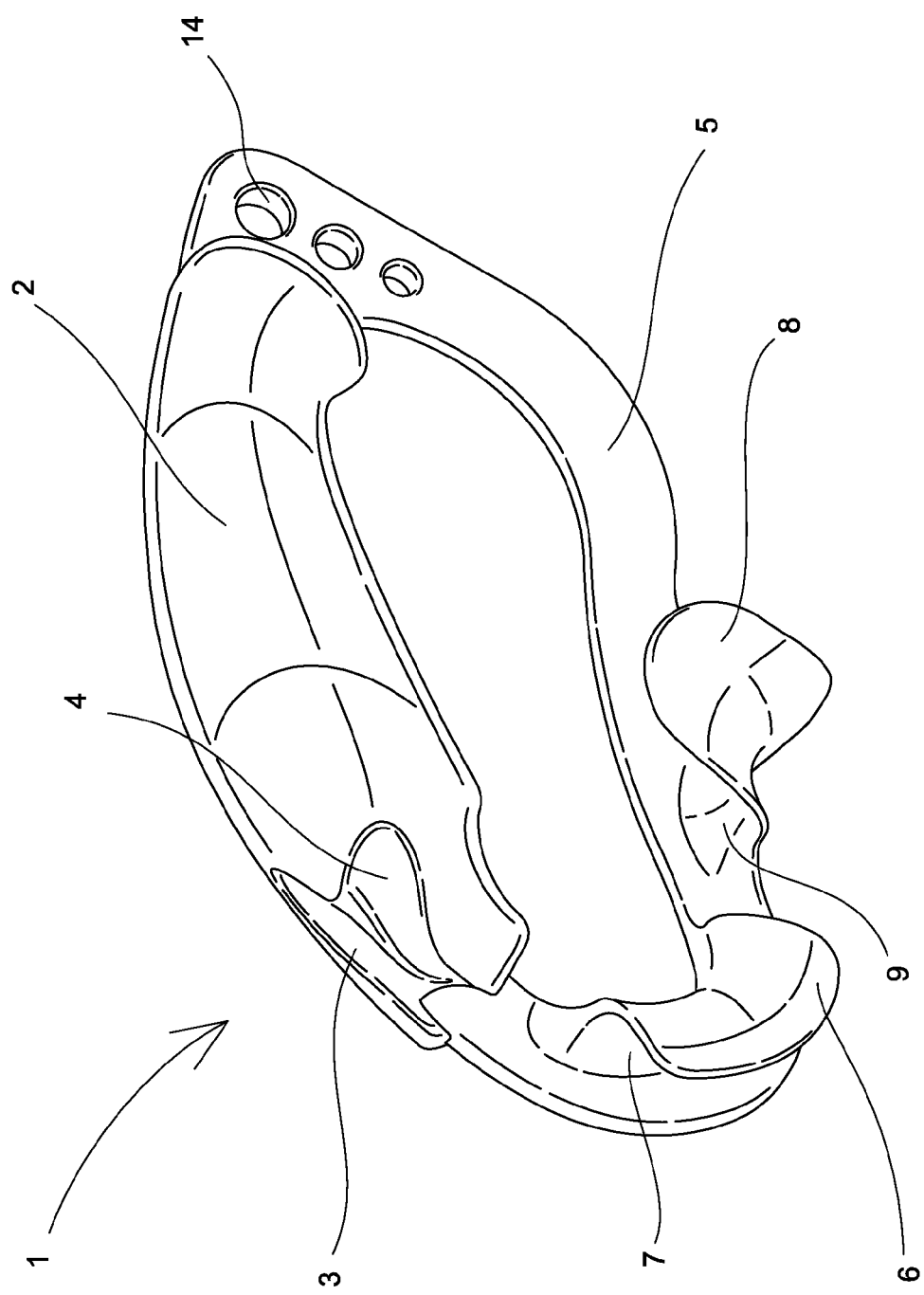
FIG. 1 is a perspective view of a first embodiment of the present invention.

1 Anchor retrieval device
2 Handle
3 Straight grip groove
4 Side grip groove
5 Frame
6 Upper rope guide flange
7 Upper rope guide groove
8 Lower rope guide flange
9 Lower rope guide groove
10 Pointed protrusions (teeth)
11 Ribs
12 Rope
13 User hand
14 Lanyard hole
15 Rope pathway

DETAILED DESCRIPTION OF INVENTION

Figure 3:
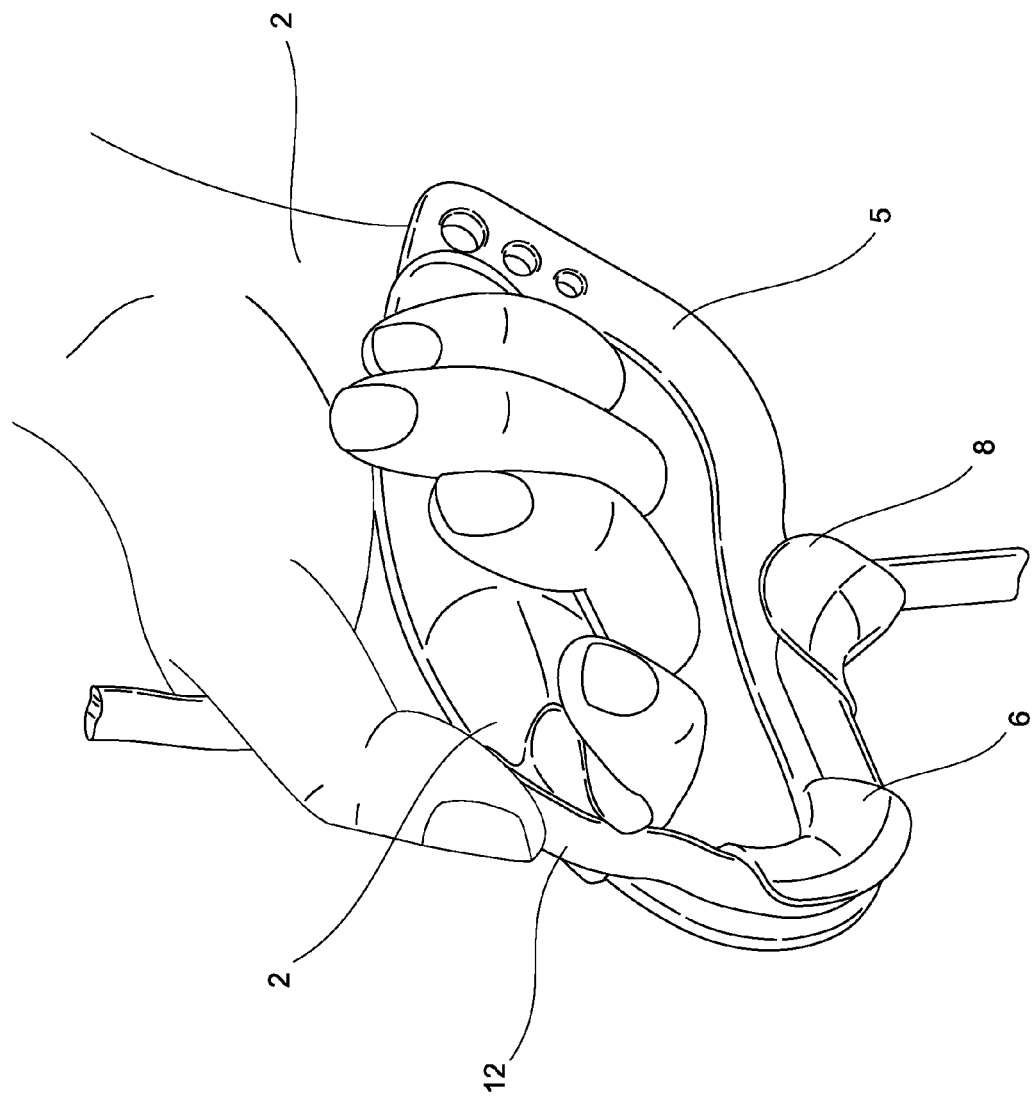
FIG. 3 is a perspective view of the device with the anchor line in the straight grip groove in a locked position.
Figure 4:
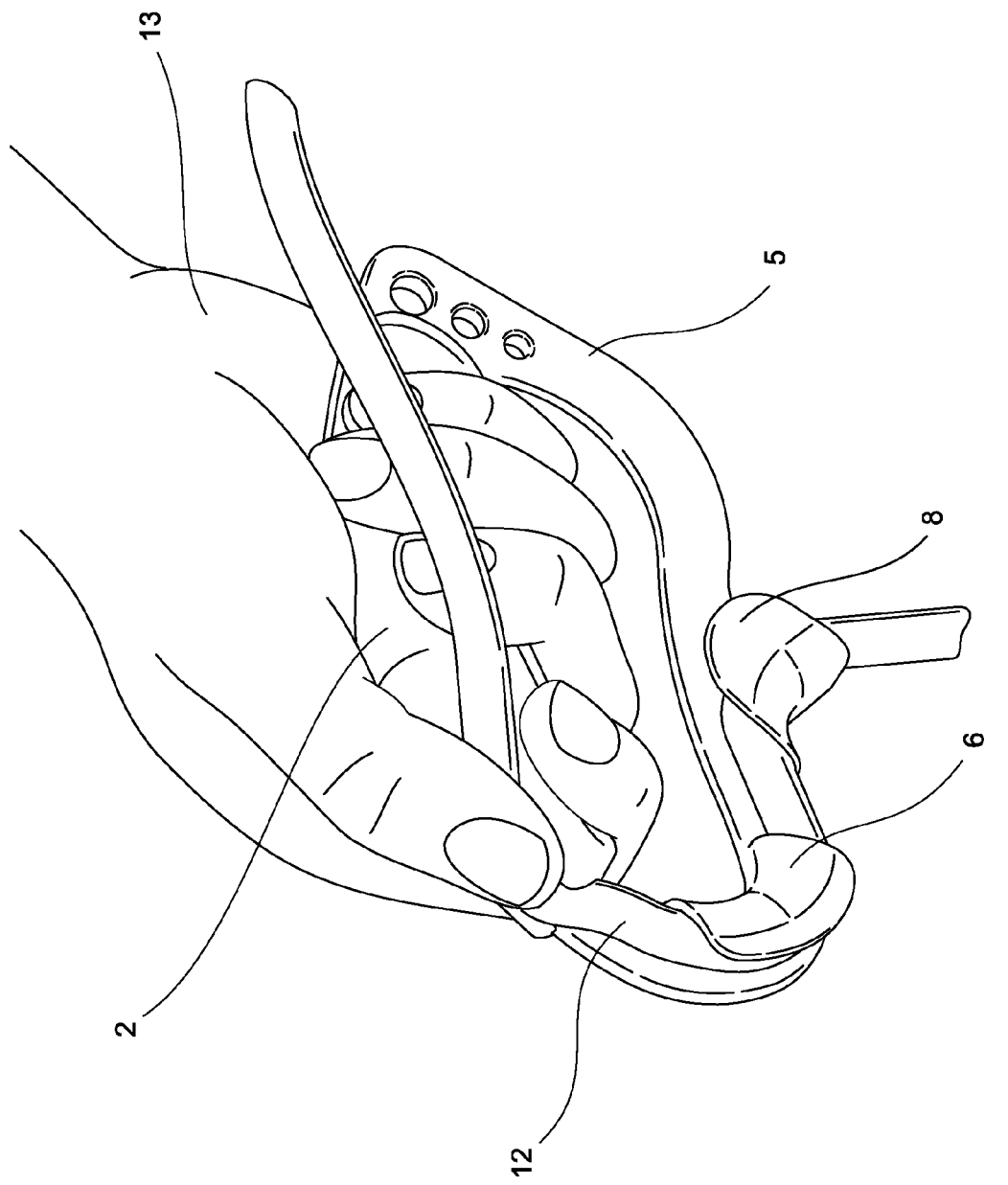
FIG. 4 is a perspective view of the device with the anchor line in the side grip groove in a locked position.

FIG. 1 is a perspective view of a first embodiment of the present invention. As shown in this figure, the anchor retrieval device 1 is comprised of a frame 5 (preferably aluminum) and a handle 2 with a proximal end (near the lanyard holes 14) and a distal end. In a preferred embodiment, the handle 2 is comprised of a pliable plastic overlaid onto the frame 5, which forms a closed loop. For reference purposes, that part of the frame on which the handle 2 is located will be referred to as the top of the frame 2. The distal end of the handle 2 comprises a straight grip groove 3 and a side grip groove 4, the purpose of which is illustrated in FIGS. 3 and 4. The entire frame 5 forms a roughly oblong shape. The proximal end of the frame is that end closest to the proximal end of the handle 2, and the distal end of the frame 5 is that end closest to the distal end of the handle 2. The proximal end of the frame 5 optionally comprises a plurality of holes 14, preferably of different sizes, for attaching a lanyard.

Figure 5:
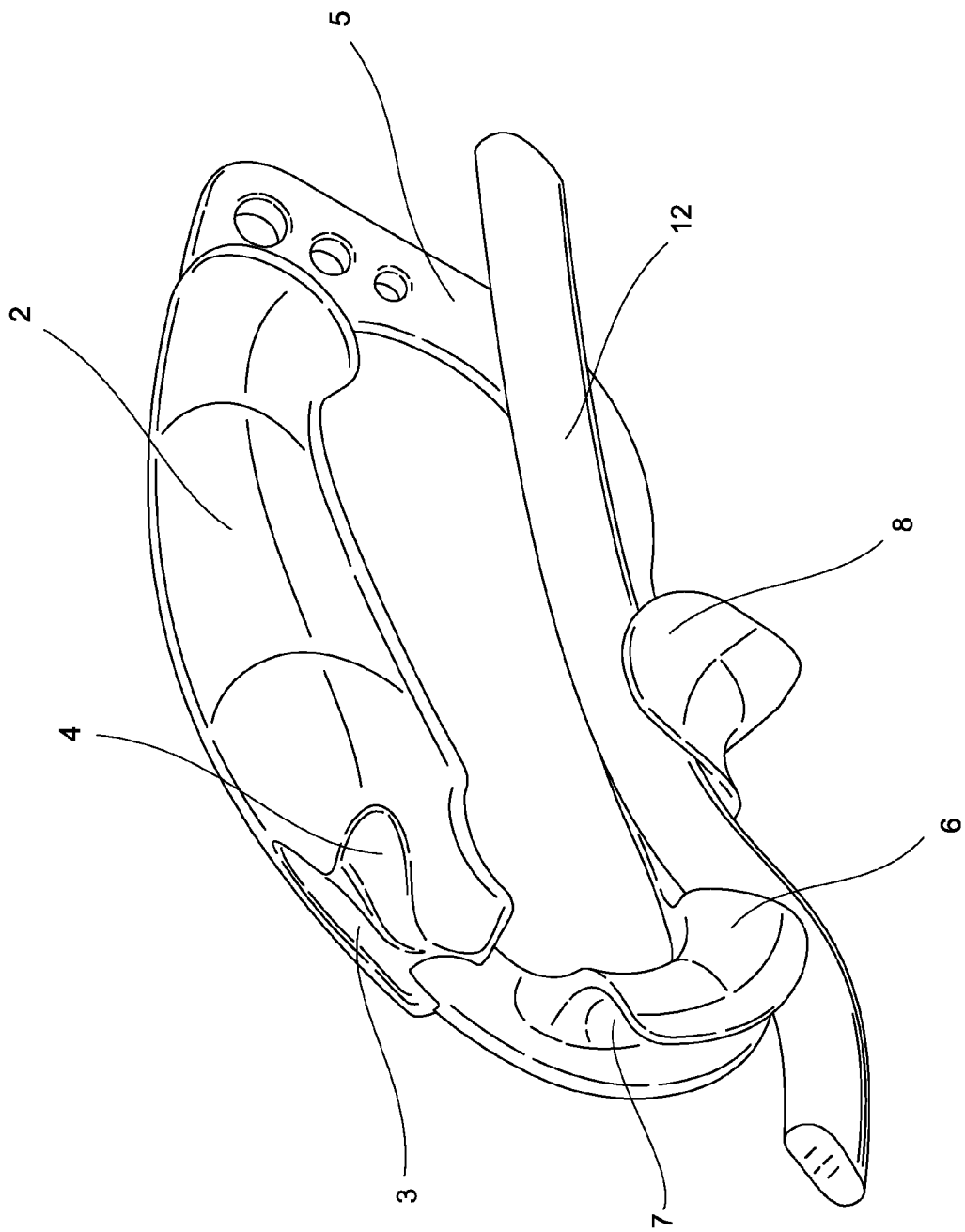
FIG. 5 is a perspective view of the device with the anchor line in a free-sliding position.

Situated on the frame at the front of the device (that is, on the distal end, opposite the lanyard holes 14) are an upper rope guide flange 6 and an upper rope guide groove 7. Situated on the frame 5 to the rear of the upper rope guide flange 6 and upper rope guide groove 7 (on the bottom of the frame 5) are a lower rope guide flange 8 and a lower rope guide groove 9. The upper rope guide groove 7 is formed by the upper rope guide flange 6, and the lower rope guide groove 9 is formed by the lower rope guide flange 8. The purpose of the upper rope guide flange 6, upper rope guide groove 7, lower rope guide flange 8, and lower rope guide groove 9 is shown in FIG. 3-5, discussed below.

Figure 2:
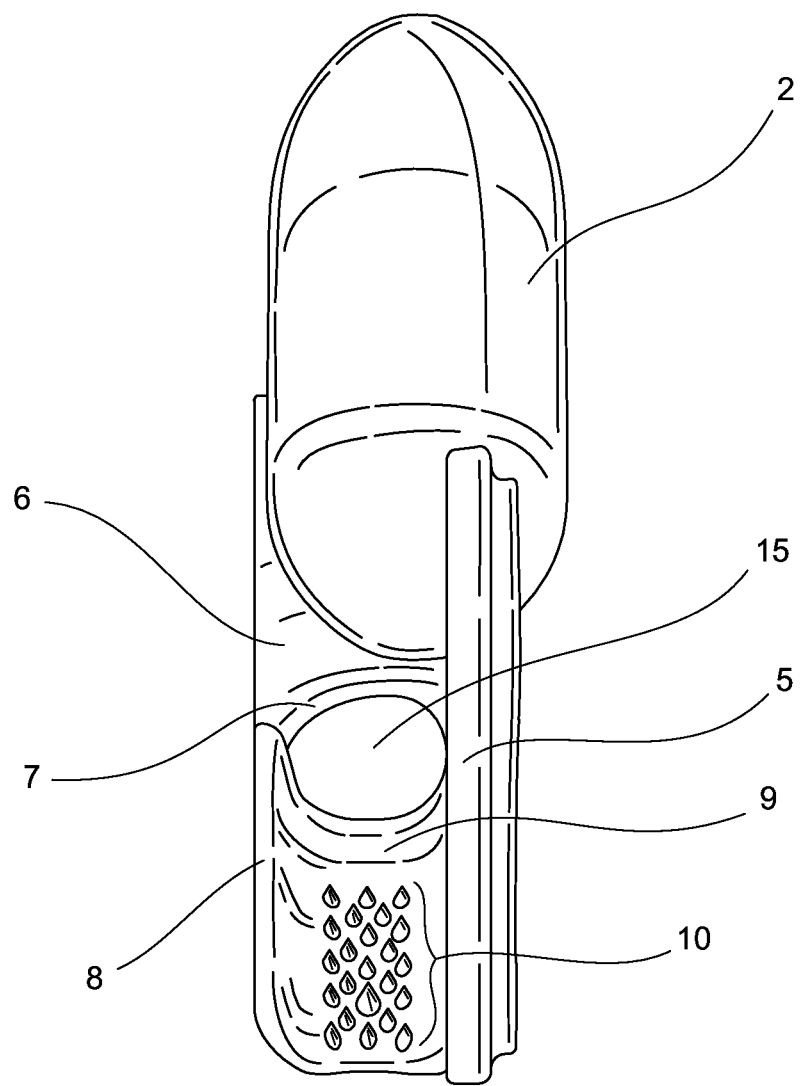
FIG. 2 is a rear view of the embodiment shown in FIG. 1.

FIG. 2 is a rear view of the embodiment shown in FIG. 1. As shown in FIG. 2, the lower rope guide groove 9 preferably comprises a plurality of pointed protrusions or teeth 10, which serve to grip the rope (or anchor line) when it is situated in the lower rope guide groove 9 (see FIG. 6). These teeth 10 are located on the inside surface of the lower rope guide groove 9. Although the upper rope guide groove 7 may also comprise similar teeth (not shown in these figures), the inventors have found that it is preferable to include teeth on the lower rope guide groove 9 only to avoid over-stretching of the rope and to make it easier to remove the rope from the device.

FIG. 2 also illustrates the rope pathway 15 that is created by the upper and lower rope guide grooves 7, 9. As shown, the lower rope guide groove 9 forms the floor of the rope pathway 15, and the upper rope guide groove 7 forms the ceiling of the rope pathway 15. The two flanges 8, 6 are configured so that the grooves 7, 9 form a rope pathway 15 that encircles the rope (see, e.g., FIGS. 5 and 7).

FIG. 3 is a perspective view of the device with the anchor line in the straight grip groove in a locked position, and FIG. 4 is a perspective view of the device with the anchor line in the side grip groove in a locked position. As shown in these figures, when the device is in a locked position, the rope 12 passes through the lower rope guide groove 9 (where it is gripped by the teeth 10) and the upper rope guide groove 7 and then either the straight grip groove 3 or the side grip groove 4. As shown in FIG. 5, the straight grip groove 3 is located on the central longitudinal axis of the handle 2, whereas the side grip groove 4 is offset from the straight grip groove 3 and is situated on the side of the handle 2 closest to the upper and lower rope guide grooves 7, 9. The purpose of the straight grip and side grip grooves 3, 4 is to allow the user to hold the rope 12 in place by putting pressure on the rope with the user's thumb. The user may elect to use the straight grip groove 3 or the side grip groove 4, depending on which is most comfortable for the user. In either of these positions, the device is prevented from slipping on the rope 12.

FIG. 5 is a perspective view of the device with the anchor line in a free-sliding position. Note that in this position, the rope 12 is not engaged with the teeth 10 in the lower rope guide groove 9. Rather, the rope 12 passes through the rope pathway 15 shown in FIG. 2. In this position, the device 1 can be slid along the rope 12 until the user decides to move the device into a locked position. When the device is parallel to the rope (as shown in this figure), it can slide down (or up) the rope unhindered. Once the device is in the desired position on the rope, to lock the device, the tool is rotated ninety degrees (90°), and the rope is gripped by the user's thumb, as described above and shown in FIGS. 3 and 4. This rotation of the device also causes the rope to engage with the teeth 10 inside the lower rope guide groove 9.

The rope 12 is fully retrieved by engaging in a series of slide-and-lock motions. The rope is pulled into the boat with the device in an unlocked position, the device is rotated and locked onto the rope to prevent the weight of the anchor from pulling the rope back down, and the cycle is repeated until the anchor has been fully retrieved.

Figure 6:
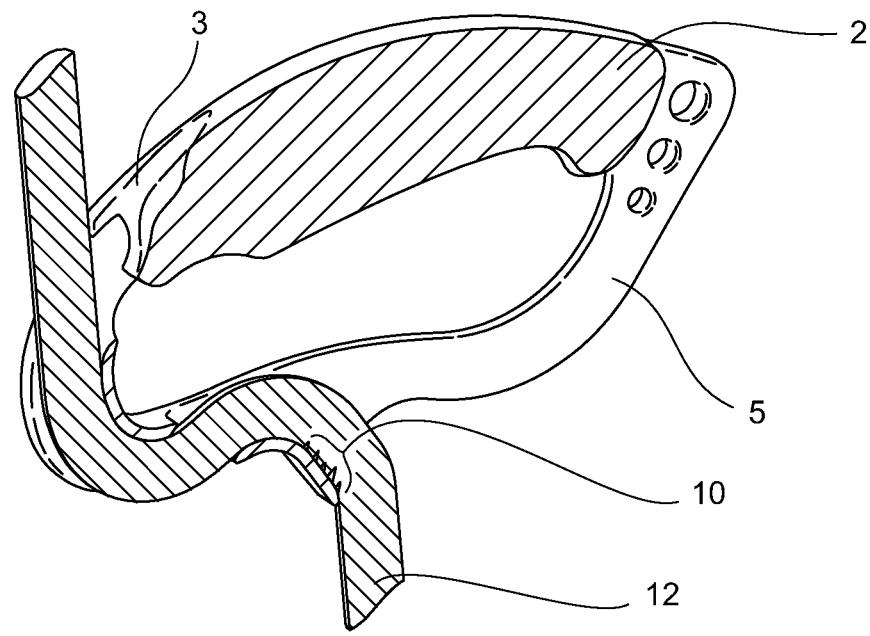
FIG. 6 is a section view of the device with the anchor line in a locked position.
Figure 7:
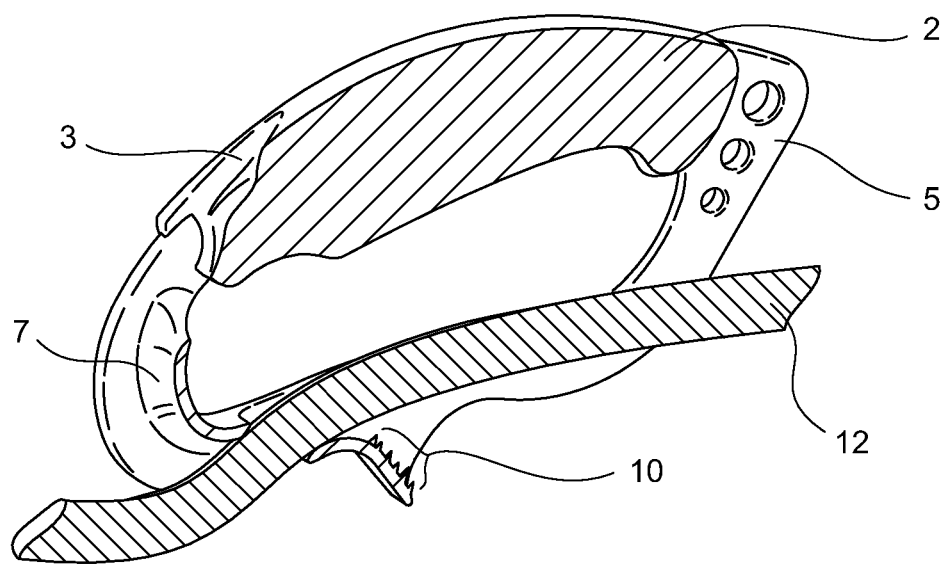
FIG. 7 is a section view of the device with the anchor line in a free-sliding position.

FIG. 6 is a section view of the device with the anchor line in a locked position, and FIG. 7 is a section view of the device with the anchor line in a free-sliding position.

Figure 8:
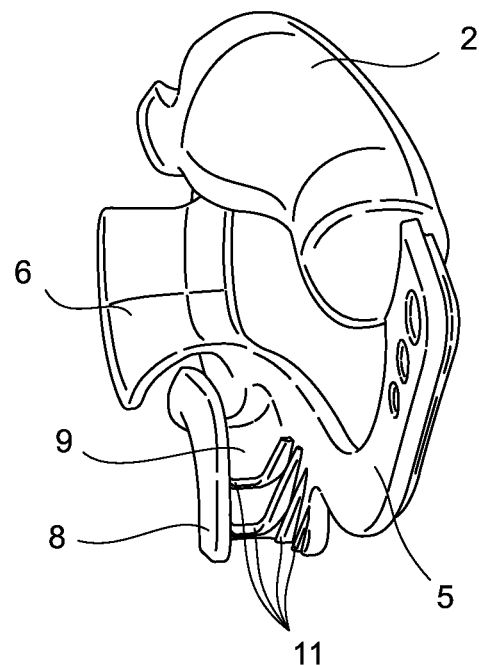
FIG. 8 is a first rear perspective view of an alternate embodiment of the present invention.
Figure 9:
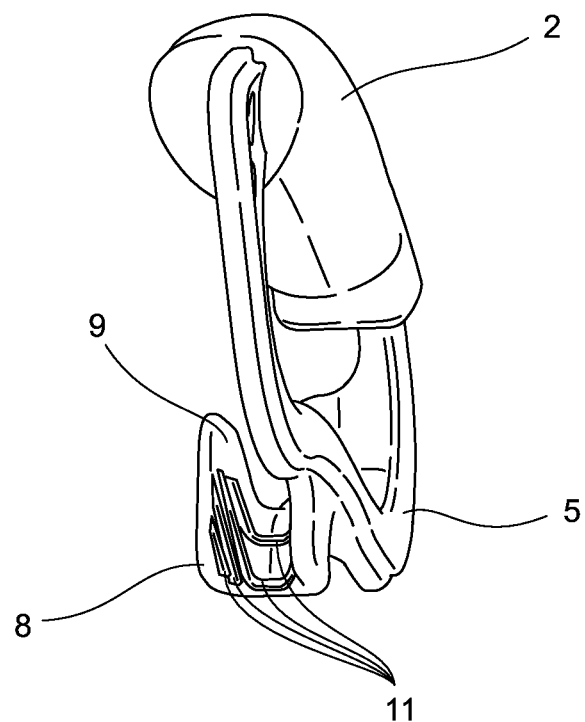
FIG. 9 is a second rear perspective view of an alternate embodiment of the present invention.

FIGS. 8 and 9 are rear perspective views of an alternate embodiment of the present invention. In this embodiment, the teeth 10 of the first embodiment are replaced with ribs 11 that extend from the bottom and up the side walls of the lower rope guide groove 9. The ribs 11 are preferably tapered so that they are thinner on the top and thicker on the bottom. Unlike the teeth 10 in the previous embodiment, which engage the bottom of the rope only, the ribs 11 grip (pinch) the rope from the sides. Thus, this embodiment may be better suited to accommodating ropes of different diameters. The inventors have found that this embodiment also causes less wear on the rope and, therefore, leads to longer rope life.

Figure 10:
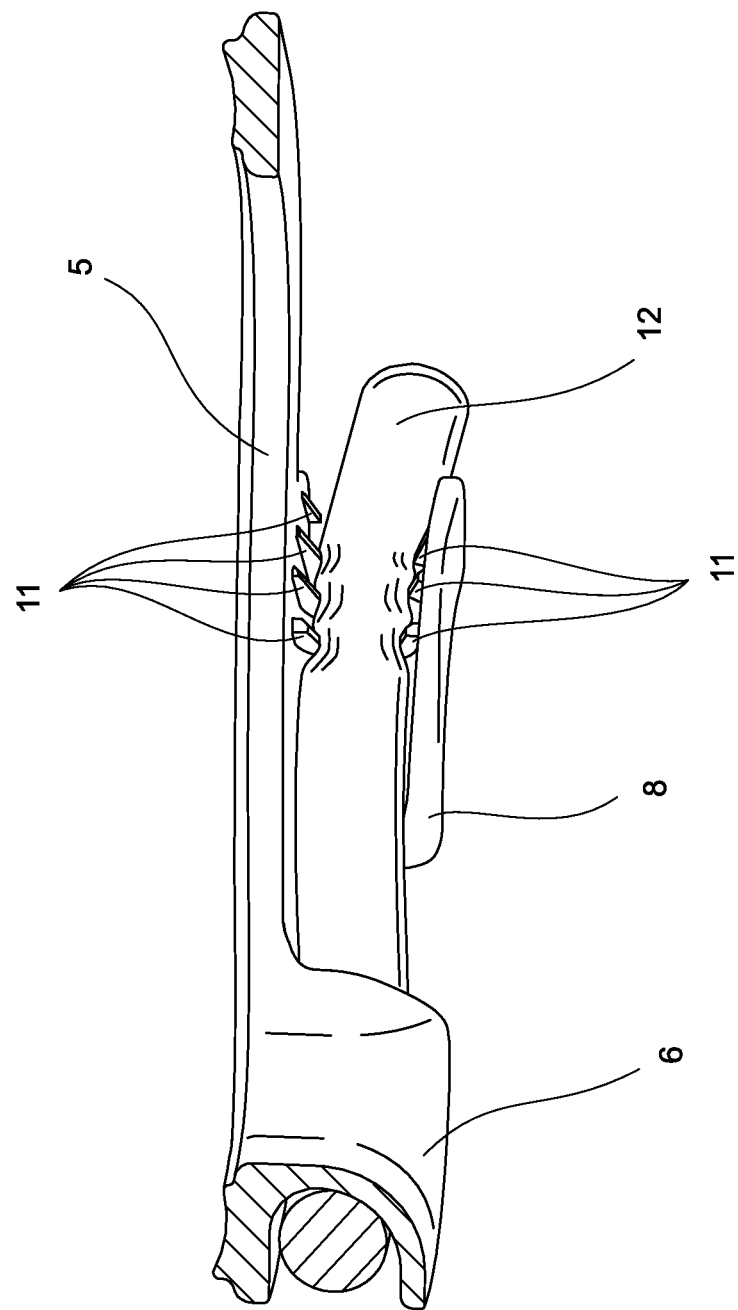
FIG. 10 is a top section view of the embodiment shown in FIGS. 8 and 9.
Figure 11:
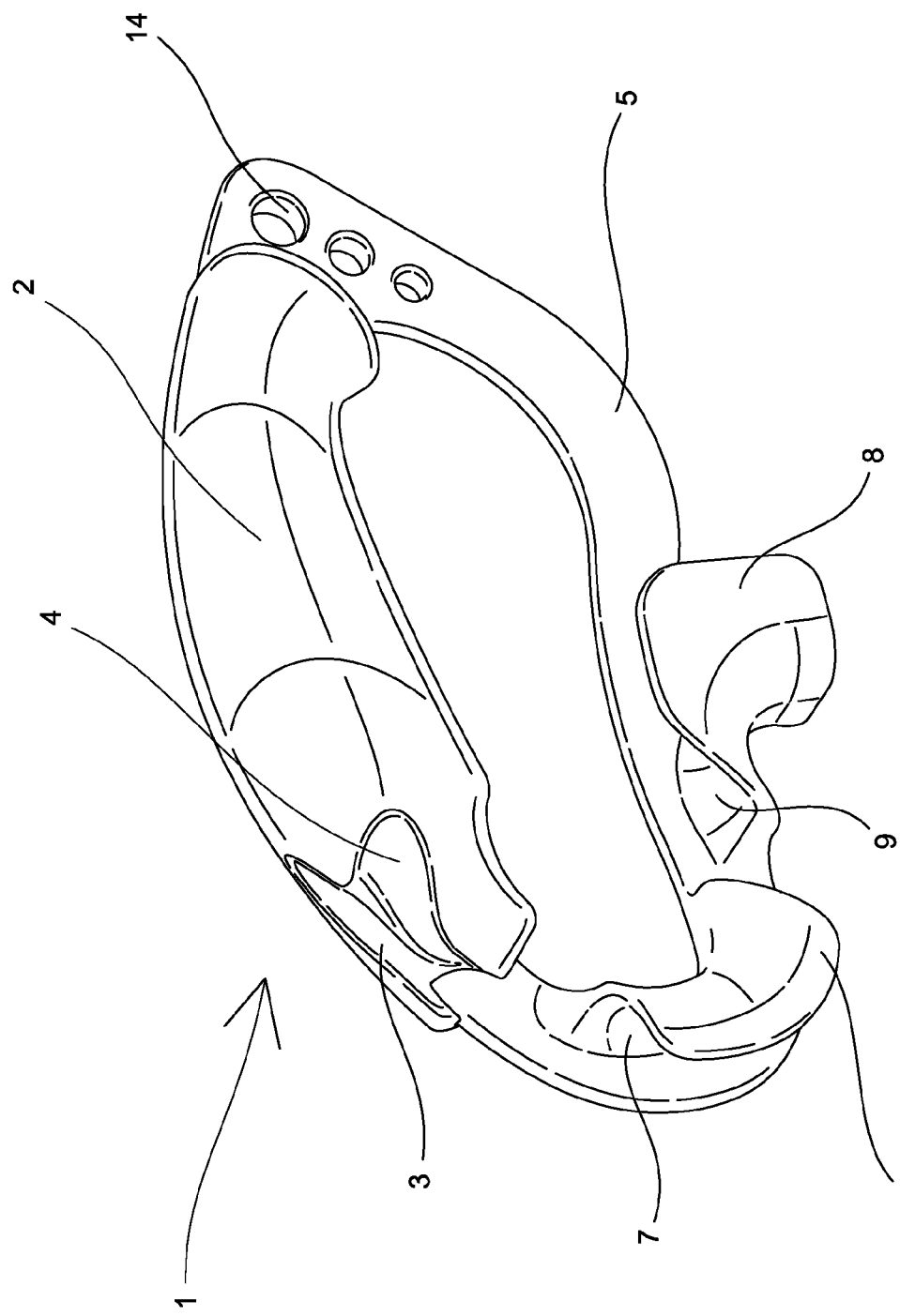
FIG. 11 is a perspective view of the alternate embodiment shown in FIGS. 8-10.

FIG. 10 is a top section view of the embodiment shown in FIGS. 8 and 9. This figure shows the rope 12 being pinched or squeezed on the sides by the ribs 11. Note also that with this embodiment, the lower rope guide flange 8 is deeper than in the previous embodiment (compare FIG. 1 to FIG. 11). This is to accommodate the ribs 11 inside of the lower rope guide flange 8. In all other respects, the alternate embodiment is the same as the embodiment described in connection with FIGS. 1-7.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An anchor retrieval device comprising a frame forming a closed loop and having a proximal end and a distal end, and a handle overlaid onto the frame on a top part of the frame;
   wherein the frame comprises an upper rope guide flange that forms an upper rope guide groove, the upper rope guide flange and upper rope guide groove being situated on the distal end of the frame;
   wherein the frame further comprises a lower rope guide flange that forms a lower rope guide groove, the lower rope guide flange and lower rope guide groove being situated rearward of the upper rope guide flange and upper rope guide groove on a bottom part of the frame; and
   wherein the handle has a proximal end and a distal end, and the distal end of the handle comprises a straight grip groove located on a central longitudinal axis of the handle and a side grip groove that is offset from the straight grip groove and situated on a side of the handle proximate to the upper rope guide groove and the lower rope guide groove.

2. The anchor retrieval device of claim 1, wherein the proximal end of the frame comprises a plurality of holes for attaching a lanyard.

3. The anchor retrieval device of claim 1, wherein the lower rope guide groove comprises a bottom, two side walls, and a plurality of ribs that extend from the bottom of the lower rope guide groove and up to the two side walls of the lower rope guide groove.

* * * * *